(12) United States Patent
Castro

(10) Patent No.: US 6,305,055 B1
(45) Date of Patent: Oct. 23, 2001

(54) FASTENER PROVIDED WITH A SNAPPING-IN FOOT TO BE PUSHED IN THROUGH A HOLE IN A PANEL

(75) Inventor: Dominique Castro, La Rue Saint Pierre (FR)

(73) Assignee: ITW de France, Beauchamp (FR)

( * ) Notice: Subject to any disclaimer, the term of this patent is extended or adjusted under 35 U.S.C. 154(b) by 0 days.

(21) Appl. No.: 09/498,639

(22) Filed: Feb. 7, 2000

(30) Foreign Application Priority Data

Feb. 9, 1999 (FR) .................................................. 99 01501

(51) Int. Cl.[7] .......................... A44B 21/00; F16B 13/02; F16B 19/10
(52) U.S. Cl. ............................... 24/458; 411/509; 411/508
(58) Field of Search .............................. 24/458, 453, 297, 24/324; 411/508, 913, 509, 510

(56) References Cited

U.S. PATENT DOCUMENTS

| | | | |
|---|---|---|---|
| 3,177,540 | 4/1965 | Hall et al. | |
| 3,485,133 | * 12/1969 | Rapata | 411/508 |
| 3,678,797 | * 7/1972 | Seckerson | 411/509 |
| 3,745,612 | * 7/1973 | Seckerson | 411/509 |
| 4,668,145 | * 5/1987 | Hirshita | 411/508 |
| 5,573,362 | * 11/1996 | Asami et al. | 411/509 |

FOREIGN PATENT DOCUMENTS 2 132 919   11/1972   (FR) .

* cited by examiner

*Primary Examiner*—Robert J. Sandy
(74) *Attorney, Agent, or Firm*—Lowe Hauptman Gilman & Berner, LLP

(57) ABSTRACT

The snapping-in foot (3) of this fastener (1) has a flat rigid web (10) and two curved flexible flanges (11A, 11B) each connected to the web (10) and having, opposite a plane face (14A) of the web, an internal surface bordered by this plane face of the web, by a longitudinal edge (16A) of this flange and by a transverse edge of this flange, with the internal surface of each flange (11A) being concave and with the longitudinal edge (16A) of each flange having, seen by an observer disposed parallel to the plane face (14A) of the web (10) opposite this internal surface, a V shape whose apex, directed outwards, is situated at the level of a change-of-direction plane (18) on each side of which the external surface of the foot (3) tapers.

15 Claims, 2 Drawing Sheets

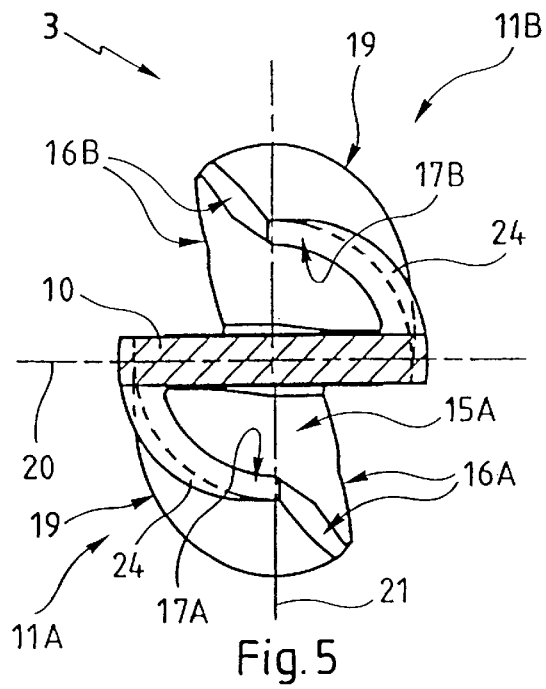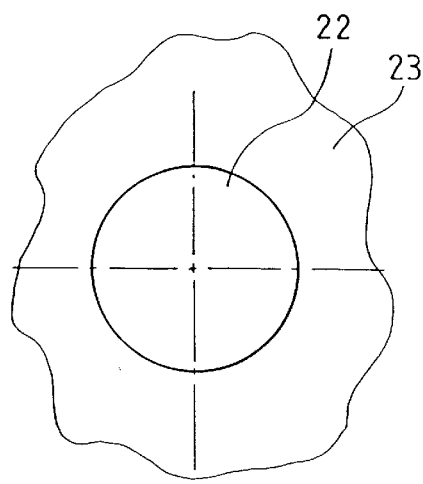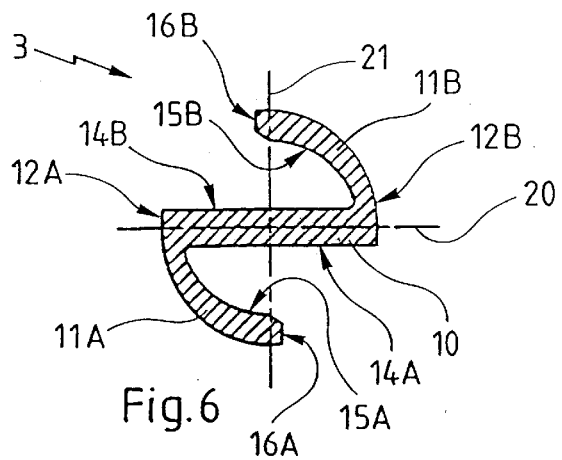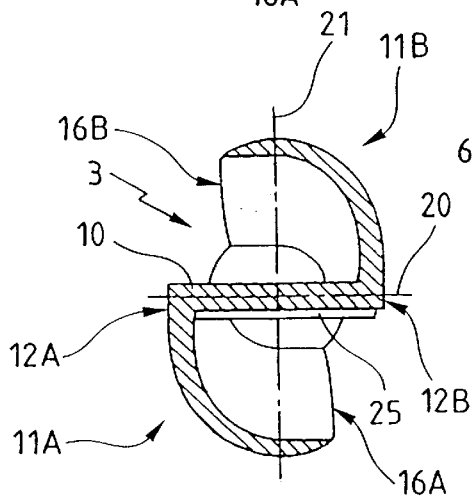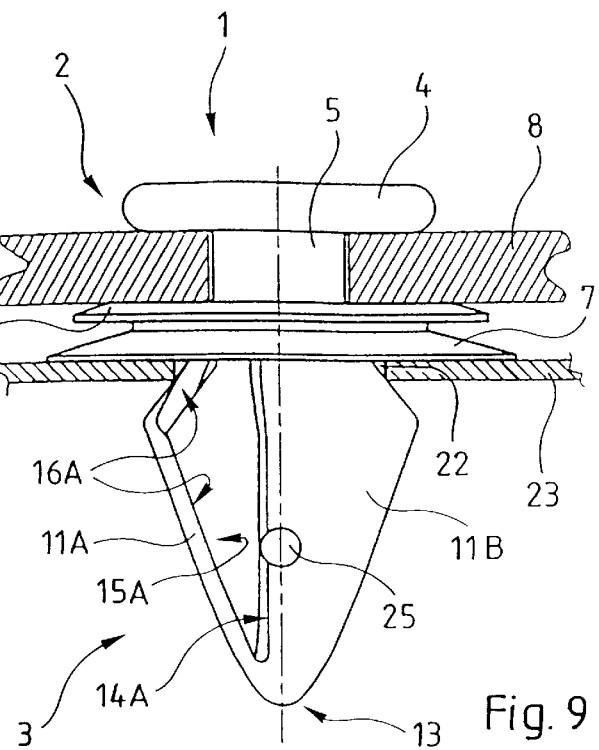

FASTENER PROVIDED WITH A SNAPPING-IN FOOT TO BE PUSHED IN THROUGH A HOLE IN A PANEL

The invention relates to fasteners capable of being fixed to a panel such as a car bodywork sheet.

Such fasteners are already known which are provided, for fixing them, with a snapping-in foot to be pushed in through a hole in the panel with a predetermined diameter.

In particular, French certificate of addition 2.132.919 describes such a fastener whose snapping-in foot has a flat rigid web and two curved flexible flanges, the flat rigid web having two longitudinal edges converging towards a pointed end whilst the other end of the said web is connected to the remainder of the fastener, each curved flexible flange being connected to the web along a respective one of its two longitudinal edges and having, opposite a respective flat face of the said web, an internal surface bordered by this plane face of the web, by a longitudinal edge of this flange and by a transverse edge of this flange; the external surface of the snapping-in foot tapering respectively towards the pointed end and towards the transverse edge of the flanges, on each side of a change-of-direction plane oriented transversely to the axial direction of the foot, this external surface of the foot having, at the level of the change-of-direction plane, a roughly oval shape, the small width of which, corresponding to the diameter of the hole in the panel, is situated along the median axial plane of the web and the large width of which is situated along the axial plane oriented transversely to the median axial plane of the web.

When the snapping-in foot is pushed in through the hole in the panel, the cooperation between the periphery of the hole and the external surface of the foot has the effect that each flange, as long as it is in contact with the periphery of the hole through its insertion portion situated between the pointed end and the change-of-direction plane, flexes by elastic deformation towards the plane face of the web which faces the internal surface of this flange, the flanges thus flexing gradually as pushing in occurs until the moment when the insertion part of the flanges has passed through the hole, each of the flanges then expanding, the cooperation between the periphery of the hole and the external surface of the flange-retaining part situated between the change-of-direction plane and the transverse edge having the effect of driving the foot in the direction of pushing in until the remainder of the fastener is in abutment on the face of the panel situated on the insertion side, through a tapered sealing collar.

The invention aims to improve the performance of this type of fastener, and in particular to minimise the force required for inserting the snapping-in foot through the hole and to maximise the retaining force procured by the snapping-in foot in order to prevent the fastener from being pulled out.

To this end the invention proposes a fastener which is characterised in that the said internal surface of each flange is concave and in that the said longitudinal edge of each flange has, seen by an observer disposed parallel to the plane face of the web facing its internal surface, a V shape whose apex, directed outwards, is situated at the level of the said change-of-direction plane on each side of which the external surface of the foot tapers.

By virtue of these characteristics, it is possible to ensure that each flange deforms as well as possible, requiring, in order to flex towards the web, only a moderate force for pushing in the foot, and offering, during its elastic expansion, an excellent restoration of the energy stored during pushing in, by virtue of which it is possible to obtain high resistance to pulling out of the foot.

It should be noted in addition that the fastener according to the invention can be produced with less material than the above-mentioned prior fastener, whose flanges have an internal surface which is not concave.

According to preferred characteristics, each said flange is formed so as to flex towards the web so that at least a major part of the length of its said longitudinal edge comes into contact at the same moment with the plane face of the web.

Thus the material of each of the flanges is used particularly effectively since on the one hand it is avoided interfering with the flexion of the flange towards the plane face of the web by the premature coming into abutment on this face of a small portion of the longitudinal edge of the flange and since on the other hand each flange has, at each level of at least the major part of the length of its longitudinal edge, the maximum circumferential dimension compatible with the correct flexion towards the web.

According to preferred characteristics of use, notably for reasons of convenience in production, the said longitudinal edge of each flange is oriented in an oblique plane cutting the said plane face of the web which faces the internal surface of this flange, along a slanting line oriented, from the join between this plane face and the longitudinal edge of this flange, towards the said other end by means of which the said web is connected to the remainder of the fastener and towards the said longitudinal edge of the web along which this flange is connected, the angle between the said plane face and the said oblique plane being obtuse on the side of this flange.

According to other preferred characteristics, the insertion part of each flange, situated between the said pointed end and the said change-of-direction plane, has, over at least a major part of its circumferential direction, a thickness which is roughly constant along each axial plane.

Control of the way in which the insertion part of the flanges deforms during pushing in is thus particularly easy, since there is no variation in thickness in the axial direction.

According to other preferred characteristics, the said insertion part of each flange, situated between the said pointed end and the said change-of-direction plane, has a thickness which is greater along the longitudinal edge of the web to which this flange is connected than along the longitudinal edge of this flange.

The deformation of this insertion part of each flange, which is the one which is in contact with the periphery of the hole when the flange flexes towards the web, is easier, the closer to the longitudinal edge, so that the deformation is distributed along the circumferential direction of the flange, which demands relatively little force, and in any event less force than if this part of the flange were relatively rigid from its longitudinal edge to close to the web.

Preferably, for reasons of convenience of production and/or quality of results obtained:

the insertion part of each flange has, over at least a major part of its length, a thickness decreasing evenly towards the longitudinal edge of this flange; and/or the insertion part of each flange has a longitudinal edge which is filiform over at least a major part of its length.

According to other preferred characteristics, the retaining part of each flange, situated between the said change-of-direction plane and the said transverse edge, has, over at least a major part of its circumferential direction, a thickness which is roughly constant along each axial plane.

Control of the way in which the retaining part of the flange is deformed during the pushing in and holding in place of the fastener, is thus particularly easy, since there is no variation in the thickness in the axial direction.

According to other preferred characteristics, the retaining part of each flange, situated between the said change-of-direction plane and the said transverse edge of each flange, has a lesser thickness along the longitudinal edge of the web to which this flange is connected than along the longitudinal edge of this flange.

The deformation of the retaining part of each flange is thus essentially of the type with tilting about the join between this part of the flange and the web, given that it is at this join that this part of the flange is the most flexible whilst it is close to its longitudinal edge that it is the most rigid.

Preferably, for reasons of convenience of production and/or quality of results obtained:

the retaining part of each flange has, over at least a major part of its length, a thickness increasing evenly towards the longitudinal edge of this flange; and/or the retaining part of each flange has a longitudinal edge which is thick over at least a major part of its length.

According to other preferred characteristics, the insertion part of each flange, situated between the said pointed end and the said change-of-direction plane, is longer than the retaining part of this flange, situated between the said change-of-direction plane and the said transverse edge of this flange.

The distance over which it is necessary to exert a pushing-in force during snapping-in is thus longer than the distance over which the elastic expansion of the flanges procures the driving of the foot in the direction of pushing in and the resistance to pulling out, this difference in distance meaning that the elastic energy stored during pushing in can supply a force of resistance to pulling out which is higher than the mean force during pushing in.

It will be observed that a particularly high difference is obtained between the pushing-in force and resistance to pulling out in using the aforementioned characteristics by virtue of which each flange deforms, over its insertion part, in a manner which is distributed along the circumferential direction of the flanges, whilst in the retaining part each flange deforms by tilting of the join between this part of the flange and the web.

Preferably, for reasons of convenience and production, the external surface of the said foot has, at the level of the said axial plane oriented transversely to the said median axial plane of the web, an inclination with respect to the axial direction which is approximately the same on each side of the said change-of-direction plane whilst, at the level of the said median axial plane of the web, the said external surface is substantially parallel to the axial direction between the said change-of-direction plane and the said transverse edges of the flanges, whilst in this plane the external surface is curved with an inclination with respect to the axial direction which is less than the inclination of the external surface in the said transversely oriented plane.

According to other preferred characteristics, each said flange has, along its said transverse edge, a rib projecting on the outside.

This rib prevents the foot being pushed in to the point where the panel is situated beyond the transverse edge of the flanges.

According to other preferred characteristics, each said flange extends, in the circumferential direction, from the web to the longitudinal edge of this flange, in an anticlockwise direction, as seen from the said remainder of the fastener.

The pushing of the foot into the hole is thus facilitated where the operator gives the fastener a rotation movement in the clockwise direction, as he has a tendency to do spontaneously since this corresponds to the normal direction of screwing.

The disclosure of the invention will now be continued with a detailed description of an example embodiment given below for illustration and non-limitatively, with reference to the accompanying drawings. In these:

FIG. 5 is a view in section marked by V—V in FIG. 2, the sealing collar not being shown;

FIG. 6 is the view in section marked by VI—VI in FIG. 2, only the part of the snapping-in foot situated at the cutting plane being depicted;

FIG. 7 is the view in section marked by VII—VII in FIG. 2;

FIG. 8 is a plan view of the panel to which the fastener illustrated is to be fixed, taken close to the hole where the snapping-in foot is to be inserted; and FIG. 9 is an elevation view in section showing the fastener fixed to the panel with a cladding element fixed to the head of the fastener.

Figure 1:
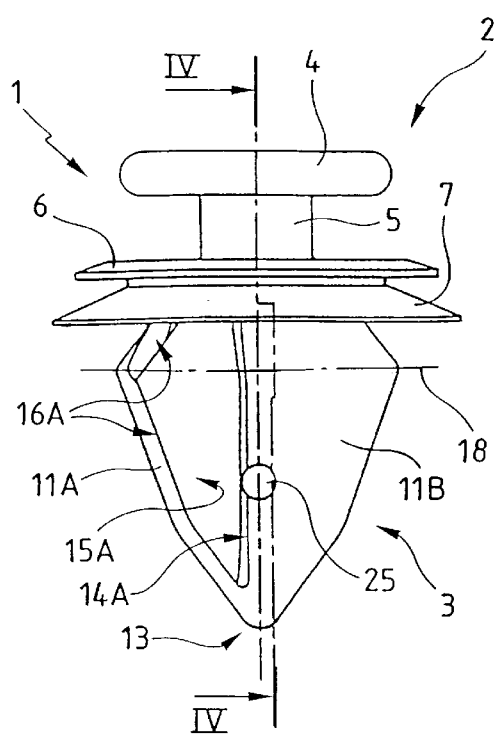
FIGS. 1 and 2 are elevation views of a fastener according to the invention, FIG. 1 being a front view and FIG. 2 a profile view taken from the side situated to the left in FIG. 1.

The fastener 1 illustrated is made from plastics material moulded in a single piece. It has a head 2 and a snapping-in foot 3.

The head 2 has, as from its end opposite to the foot 3, a face plate 4, a barrel 5, a shield 6 and a sealing collar 7, these different components being coaxial with each other and each having a circular shape overall.

The annular space situated around the barrel 5 and between the face plate 4 and shield 6 is designed to receive, as shown in FIG. 9, a cladding element 8 such as a car-body side trim having an opening in the shape of a keyhole whose round part has a diameter corresponding to that of the face plate 4 and whose elongate part has a width corresponding to that of the barrel 5, the thickness of the wall of the element 8 in which the keyhole opening is made corresponding to the distance between the face plate 4 and the shield 6, the element 8 being mounted by pushing the face plate 4 into the round part of the keyhole opening and then causing the element 8 to slide parallel to the orientation of the elongate part of the keyhole opening, so that the barrel 5 engages in this elongate part.

The sealing collar 7 conventionally has a tapered shape, but has a particularly small thickness. The shield 6 consequently has, beyond its connection with the collar 7, an extension towards the outside preventing the pushing in of the head 2 in the round part of the keyhole opening from continuing beyond the shield 6 (if the wall of the element 8 were to abut directly against the collar 7, the flexibility of the latter would mean that the collar could pass through the round part of the keyhole opening).

The snapping-in foot 3 has a flat web 10 and two curved flanges 11A and 11B.

Figure 2:
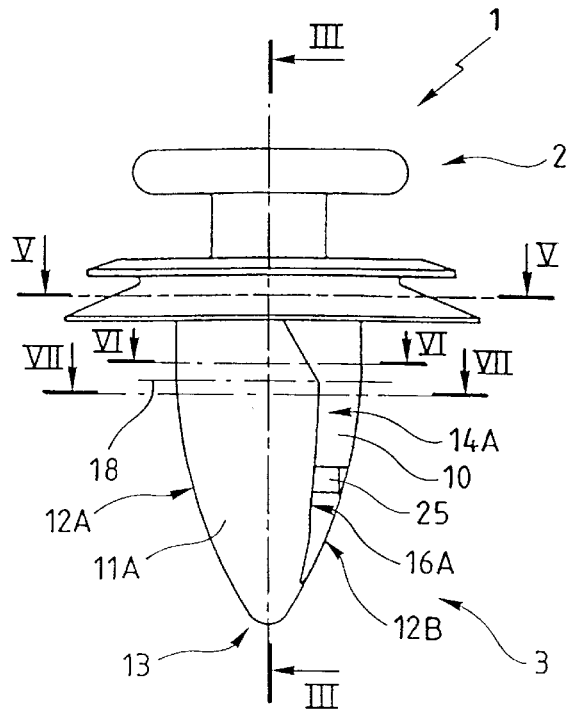

The web 10 is oriented in an axial plane and has two longitudinal edges 12A and 12B which, as can be seen in FIG. 2, converge towards the free end 13 of the foot 3, which is in the shape of a point. The other end of the web 10 is connected to the head 2, and more precisely to the shield 6, opposite to the shaft 5.

The flange 11A is connected to the web 10 along the edge 12A and has, opposite the plane face 14A of the web 10, an internal surface 15A bordered by the face 14A, by a longitudinal edge 16A and by a transverse edge 17A opposite the plate 6.

The internal surface 15A of the flange 11A is concave, and has, in the example illustrated, a profile which roughly follows that of the external surface of the foot 3.

The above description for the flange 11A is also valid for the flange 11B, provided that the suffix A in the numerical references is replaced with the suffix B.

On each side of an inflection plane 18 (FIGS. 1 and 2) oriented transversely to the axial direction of the foot 3, the external surface of the latter tapers respectively towards the pointed end 13 and towards the transverse edges 17A and 17B of the flanges 11A and 11B.

As can be seen more particularly in FIG. 5, the external surface of the foot has, at the plane 18, an edge 19 having an oval shape overall, whose small width is situated in the plane 20, which is the median axial plane of the web 10, and whose large width is situated in the plane 21, which is the axial plane oriented transversely to the plane 20.

It will be observed (see FIG. 3) that, in the plane 21 the external surface of the foot 3 has, on each side of the change-of-direction plane 18, approximately the same inclination with respect to the axial direction, whilst at the edges 12A and 12B (see FIG. 2) the external surface of the foot 3 is parallel to the axial direction of the side situated between the plane 18 and the edges 17A and 17B, whilst between the plane 18 and the end 13 the edges 12A and 12B are curved with an inclination with respect to the axial direction which is less than that of the external surface along the plane 21.

Thus the inclination of the external surface of the foot 3 increases between the planes 20 and 21, with a greater variation in the part situated between the plane 18 and the edges 17A or 17B.

Figure 3:
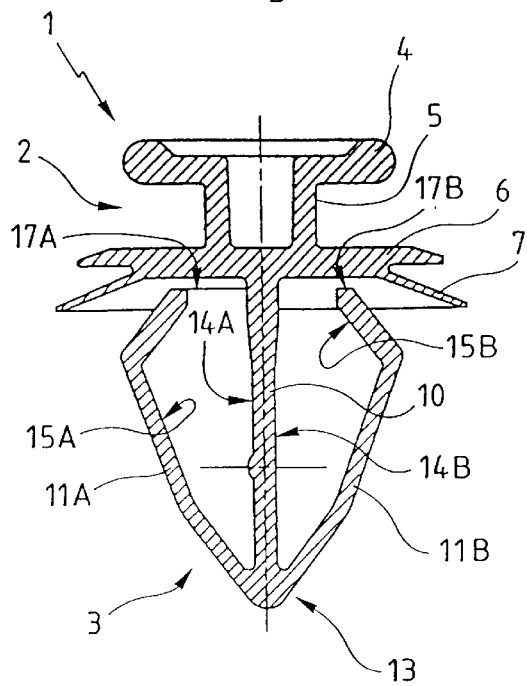
FIGS. 3 and 4 are elevation views in section marked respectively by III—Ill and IV—IV in FIGS. 2 and 1.
Figure 4:
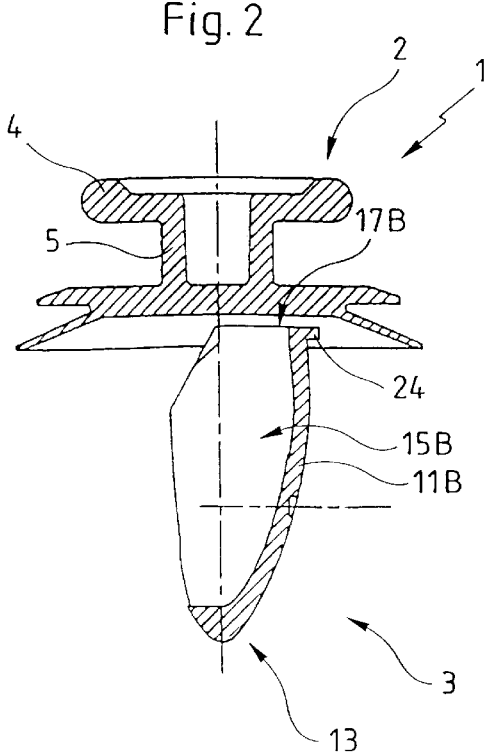

As can be seen in FIGS. 3 and 4, the part of each of the flanges 11A and 11B situated between the pointed end 13 and the change-of-direction plane 18 has, in the cutting planes of these figures, a roughly constant thickness, and the same applies to any axial plane over almost all its circumferential direction.

A similar observation is valid for the part of each of the flanges 11A and 11B situated between the plane 18 and the transverse edge 17A or 17B.

A description will now be given of certain details of the flange 11A, it being understood that this description is equally valid for the flange 11B provided that the suffix A in the numerical references is replaced with the suffix B.

The part of the flange 11A situated between the plane 18 and the pointed end 13 has a greater thickness along the edge 12A of the web 10 than along its longitudinal edge 16A, the thickness in fact decreasing regularly towards the edge 16A, which is filiform for this part of the flange 11A, as can be seen in FIGS. 1, 5 and 7.

On the other hand (see FIG. 6), for the part of the flange 11A situated between the plane 18 and the edge 17A, the thickness is less great along the edge 12A than along the edge 16A, and more precisely the thickness increases evenly as far as the edge 16A, which is thick, as can be seen notably in FIGS. 1, 5 and 6.

As shown in FIG. 2, the edge 16A has, seen by an observer disposed parallel to the plane face 14A, a V shape whose apex, directed outwards, is situated at the plane 18.

In the example illustrated, the edge 16A is oriented in an oblique plane intersecting its face 14A along a slanting line oriented, from the junction between the face 14A and the edge 16A, on a slant towards the head 2 and towards the edge 17A, the angle between the plane face and this oblique plane being obtuse on the flange 11A side.

The panel 23 to which the fastener 1 is to be fixed (FIG. 8) has a hole 22 with a circular contour having a diameter corresponding to the distance separating the edges 12A and 12B in the portion situated between the plane 18 and the edges 17A and 17B of the flanges.

The foot 3 is designed to be pushed into the hole 22, the end 13 first, the cooperation between the periphery of the hole 22 and the part of the flanges 11A and 11B situated between the end 13 and the plane 18 having the effect of causing the flanges 11A and 11B to flex progressively until this part of the foot has passed through the hole 22, the flanges then expanding, which has the effect of driving the foot 3 in the direction of pushing in until there occurs an abutment on the face of the panel 23 situated on the side by which the foot 3 was pushed in, as shown in FIG. 9, where the sealing collar 7 is applied against the panel 23.

Because of the thinness of the collar 7, provision is made for the stop which stops the pushing-in movement of the foot 3, to be present on the element to be fixed 8 rather than on the fastener 1.

To prevent the panel 23 being able to pass the edges 17A and 17B, there is provided, for security, along each of these, a rib 24 projecting on the outside (see FIGS. 4 and 5).

It will be observed that the way in which the foot 3 deforms between the end 13 and the plane 18, which is the part enabling the foot to be inserted in the hole 22, is different from the way in which the part situated between the plane 18 and the flanges 17A and 17B deforms, which serves to hold the foot 3 in the hole 22.

Because in the insertion part there is more material close to the edges 12A and 12B than close to the edges 16A and 16B, it is rather the portion situated close to the edges 16A and 16B which deforms, that is to say the portion most greatly stressed by the hole 22; whilst in the retaining portion, where there is more material close to the edges 16A and 16B than close to the edges 12A and 12B, it is rather the portion situated close to the web 10 which deforms, forming a kind of hinge around which the flange retaining portion tilts overall.

This difference in deformation helps to permit the pushing-in of the foot 3 with a relatively moderate force whilst the force of retaining in the hole 22 is relatively high.

It should be noted that the above mentioned V-shape for the edges 16A and 16B makes it possible to cause the flanges 11A and 11B to flex so that the edge 16A or 16B comes to be applied practically flat on the face 14A or 14B, that is to say a major part of its length is applied thereon at the same time.

As can be seen in FIGS. 5 to 7, each of the flanges 11A and 11B extends, in the circumferential direction, from the web 10 to the edge 16A or 16B, in the anti-clockwise direction, seen from the head 2.

Thus, if the operator, when he pushes the foot 3 into the hole 2, causes the fastener 1 to turn slightly in the clockwise direction, this facilitates the pushing-in movement.

In order to facilitate the ejection of the fastener 1 out of the mould in which it is manufactured, a rib 25 projecting on the face 14A is provided.

Numerous variants are possible according to circumstances, notably in the constitution of the head 2, which can serve for example to fix cables or tubes rather than a cladding element provided with a keyhole opening.

More generally, it should be stated that the invention is not limited to the examples described and depicted.

What is claimed is:

1. A fastener, comprising a snapping-in foot (3) adapted to be pushed in through a hole (22) in a panel (23), with said snapping-in foot (3) having a flat rigid web (10) extending in an axial direction and two curved flexible flanges (11A, 11B), said flat rigid web (10) having two longitudinal edges (12A, 12B) converging towards a pointed end (13) of said web while an other end of said web (10) is connected to a remainder (2) of the fastener, each of said curved flexible flanges (11A, 11B) being connected to said web (10) along a respective one of said longitudinal edges (12A, 12B) and having, opposite a respective flat face (14A, 14B) of said web, an internal surface (15A, 15B) bordered by said flat face of the web, by a longitudinal edge (16A, 16B) of said flange and by a transverse edge (17A, 17B) of said flange;

each of said flanges (11A, 11B) further having an external surface tapering respectively towards the pointed end (13) and towards the respective transverse edge (17A, 17B) of said flange, on each side of a change-of-direction plane (18) oriented transversely to the axial direction of the web, said external surfaces of both said flanges, at a level of said change-of-direction plane, extend in an ellipse-shaped contour one axis of which is in a median axial plane substantially parallel with and substantially evenly spaced from said flat faces (14A, 14B) of said web;

each of said flanges (11A, 11B) being elastically flexible towards the corresponding flat face (14A, 14B) of the web (10) thereby enabling said foot (3) to snap into the hole (22);

wherein the respective internal surface (15A, 15B) of each of said flanges (11A, 11B) is concave, and the respective longitudinal edge (16A, 16B) of each of said flanges has, as seen by an observer disposed parallel to the flat face (14A, 14B) of the web (10) facing its internal surface (15A, 15B), a V shape whose apex is directed outwards and situated at the level of said change-of-direction plane (18).

2. The fastener according to claim 1, wherein each of said flanges (11A, 11B) is formed so that a substantial length of the respective longitudinal edge (16A, 16B) comes into contact with the corresponding flat face (14A, 14I3) of the web (10) when said flange is flexed towards the web.

3. The fastener according to claim 1, wherein the respective longitudinal edge (16A, 16B) of each of said flanges is oriented in an oblique plane cutting said plane face (14A, 14B) of the web which faces the internal surface (15A, 15B) of this flange, along a slanting line oriented, from the join between this plane face (15A, 15B) and the longitudinal edge (16A, 16B) of this flange, towards said other end by means of which said web is connected to the remainder of the fastener and towards said longitudinal edge (17A, 17B) of the web along which this flange is connected, the angle between said plane face (14A, 14B) and said oblique plane being obtuse on the side of this flange.

4. The fastener according to claim 1, wherein a portion of each of said flanges, situated between said pointed end (13) and said change-of-direction plane (18), has a substantially constant thickness between the respective internal and external surfaces thereof in circumferential directions between the corresponding flat face (14A, 14B) and the respective longitudinal edge (16A, 16B).

5. The fastener according to claim 1, wherein a portion of each of said flanges, situated between said pointed end (13) and said change-of-direction plane (18), has a thickness between the respective internal and external surfaces thereof which is greater along the corresponding longitudinal edge (12A, 12B) of the web than along the respective longitudinal edge (16A, 16B) of said flange.

6. The fastener according to claim 5, wherein said thickness decreases uniformly from the corresponding longitudinal edge (12A, 12B) of the web towards the respective longitudinal edge (16A, 16B) of said flange.

7. The fastener according to claim 5, wherein the respective longitudinal edge (16A, 16B) is filiform over at least a substantial length thereof.

8. The fastener according to claim 1, wherein a portion of each of said flanges, situated between said change-of-direction plane (18) and said transverse edge (17A, 17B), has a substantially constant thickness between the respective internal and external surfaces thereof in circumferential directions between the corresponding flat face (14A, 14B) and the respective longitudinal edge (16A, 16B).

9. The fastener according to claim 1, wherein a portion of each of said flanges, situated between said change-of-direction plane (18) and said transverse edge (17A, 17B), has a thickness between the respective internal and external surfaces thereof which is greater along the corresponding longitudinal edge (12A, 12B) of the web than along the respective longitudinal edge (16A, 16B) of said flange.

10. The fastener according to claim 9, wherein said thickness decreases uniformly from the corresponding longitudinal edge (12A, 12B) of the web towards the respective longitudinal edge (16A, 16B) of said flange.

11. The fastener according to claim 9, wherein the respective longitudinal edge (16A, 16B) is filiform over at least a substantial length thereof.

12. The fastener according to claim 1, wherein a distance between said pointed end (13) and said change-of-direction plane (18), is longer than a distance between said change-of-direction plane (18) and said transverse edges (17A, 17B) of the flanges.

13. The fastener according to claim 12, wherein the external surface of each of said flanges said foot (3) has, in an axial plane (21) oriented transversely to the median axial plane (20) of the web, a first inclination with respect to the axial direction, and in said median axial plane (20) of the web, said external surface is substantially parallel to the axial direction in a portion between said change-of-direction plane (18) and said transverse edges (17A, 17B) of the flanges, and is curved with a second inclination with respect to the axial direction, the second inclination is less than the first inclination said transversely oriented plane (21).

14. The fastener according to claim 1, wherein each of said flanges has, along the respective transverse edge (17A, 17B) thereof, a rib (24) projecting outside.

15. The fastener according to claim 1, wherein each of said flanges extends, in circumferential directions, from the web (10) to the respective longitudinal edge (16, 16B) of said flange, counter-clockwise, as seen from said remainder (2) of the fastener.

\* \* \* \* \*